UNITED STATES PATENT OFFICE.

JAMES LOCKHART JARDINE, OF PENICUIK, SCOTLAND.

PROCESS OF PRODUCTION OF AN ACID MAGNESIUM-SULFITE SOLUTION.

1,192,640.

Specification of Letters Patent.   Patented July 25, 1916.

No Drawing.   Application filed January 29, 1916.   Serial No. 75,043.

*To all whom it may concern:*

Be it known that I, JAMES LOCKHART JARDINE, a subject of the King of Great Britain and Ireland, and a resident of Penicuik, in the county of Midlothian, Scotland, have invented a certain new and useful Improved Process of Production of an Acid Magnesium-Sulfite Solution, of which the following is the specification.

It is essential when preparing a bisulfite solution for wood resolution to take special precaution to keep the water which is associated with the base and into which the $SO_2$ gas is conveyed as cold as possible, as its temperature has considerable influence on the amount of sulfur dioxid which can be absorbed. So vitally important is it to keep the temperature low, that resort is sometimes made to artificial cooling by refrigeration, the aim being to secure a liquid with a high percentage of free or available $SO_2$. In other words, the sulfur dioxid is simply dissolved in water, so forming sulfurous acid, and a common analysis of the prepared liquor shows 4% to 5% of total $SO_2$, and of this only 1% is combined with the base. In contrast to this, a liquor suitable for the extraction of easily bleachable cellulose from bamboo and like vegetable materials having mixed lignin and pectic constituents need not contain even the bisulfite proportions of acid, provided a sufficient quantity of the base can be brought into solution.

At low temperatures, although water rapidly absorbs $SO_2$ to form sulfurous acid, this acid dissolves magnesia very slowly, and its degree of $MgSO_3$ saturation is low, and thus at ordinary temperatures it is necessary to add at least the bisulfite proportion of $SO_2$ to bring the required quantity of the base into solution. If, however, the water in which the MgO is suspended be heated, the rapidity of base solution is greatly increased, and a larger percentage can be dissolved and held in solution.

The approximate $MgSO_3$ saturation points of slightly $SO_2$ acidulated water range from 0.2% at 50° F. to 2.34% at 160° F. and the rate of progression between these points is regular. At the higher temperatures when the $MgSO_3$ saturation point is reached and there is still MgO in suspension, this by the continued addition of $SO_2$ combines and separates as crystals of $MgSO_3$, but these are again dissolved when they take up the second equivalent of $SO_2$ to form the bisulfite.

It will be seen from the foregoing that the higher the temperature the less $SO_2$ is required to effect the solution of the base, and that if a known percentage of magnesia be present in the water, it is easy to calculate what quantity of $SO_2$ must be added to secure its solution at any temperature. For example, it is desired to make an acid sulfite solution which has dissolved in it 1% of MgO and having two thirds of its $SO_2$ contents combined and one third free or available. A saturation curve plotted from the aforegiven figures shows that at 110° F. 1.3% of $MgSO_3$ can be carried in solution. This is composed, according to atomic weights, of 0.8% $SO_2$ and 0.5% of MgO; thus half the required base will have been dissolved by the addition of 0.8% $SO_2$, but saturation point has been reached, and consequently the second half of the base needs the double $SO_2$ addition, viz:—1.6%, as before solution can be insured it must be converted into the bisulfite.

If the temperature be maintained at or over 110° F. when (by the ordinary analysis) the liquor shows that 2.4% $SO_2$ has been added, it will be found that 1.6% will be combined and 0.8% will be available or free, *i. e.* held in loose combination as the bisulfite but commonly spoken of as free.

In carrying out this process any of the known types of "milk of lime" apparatus can be employed. Well calcined magnesium oxid in a powdered form is the base used, and it is by agitation kept suspended in water which has been previously heated to the desired temperature, or the heating can be gradually effected by the application of the hot or partially cooled $SO_2$ gas generated in an ordinary type of sulfur burner. On its way to the absorption or liquor making apparatus the gas is passed through a series of water cooled lead pipes, and, by varying the water supply or area exposed, the temperature of the gas may be controlled and regulated, and this may be made the means of maintaining the liquor throughout all the stages of its production at the required temperature, thereby insuring that known and predetermined proportions of combined and free $SO_2$ can be secured when the liquor reaches a fixed total $SO_2$ strength. By this means, advantage is taken of the heat of the gas to raise the liquor temperature, and by controlling it, the degree of $MgSO_3$ saturation can be varied. By the said heating, the direct and rapid solvent powers of the $SO_2$ are further enhanced, and thus an acid sulfite solution containing the percentage of base and $SO_2$ suitable for the vegetable tissue to be treated may conveniently be made; it being understood that the greater the proportion of pectic ingredients which the material contains, the larger the percentage of base must be provided, and conversely, if lignin preponderates, more $SO_2$ and less base must be provided in the resolving solution.

It will be readily seen that this process may be successfully and economically carried out in hot climates, and this is a very important feature, as a large number of the vegetable growths from which cellulose can be extracted are indigenous to the tropics.

In the specification of the prior Patent No. 1,143,401 of 1915, there is described a process for cellulose extraction from bamboo and the like. Therein is specified a magnesium bisulfite solution, and is arranged means for the relief and removal of the gasified $SO_2$, so in effect there is provided gradually throughout the cooking process a solution containing less than the bisulfite proportion of $SO_2$, with the result that the acid action of the bisulfite is very mild, and thus the basic part of the salt throughout the process is free to co-act, so insuring that the non-cellulose ingredients of the vegetable tissue are successfully extracted and retained in solution. By the means described in the first part of this specification, there may now be prepared a solution containing the requisite proportions of dissolved base and free $SO_2$, and it may be modified to suit any vegetable substance of mixed lignin and pectic properties. This process, as has already been shown, can be so controlled that the required proportion of base is present without excess of $SO_2$, and thus practically none will be gasified, and while it is being used in the cooking process, no arrangement need be made for relief or recovery.

In order to make clear the details of the action and application of a solution of this nature, particulars regarding the method of securing paper-making pulp from bamboo arundinacea as grown in southern India are now given. The disintegrated culms are cut and packed into a suitable digester and covered with a magnesium acid sulfite liquor having the following analysis:—2.4% total $SO_2$, 1.6% combined, and 0.8% free or available. All the $SO_2$ contained in this solution is required for the satisfactory chemical resolution, and as the base and fibrous tissue have affinity for it, scarcely any is liberated as gas, and thus without appreciable loss, the air which separates from the cells of the immersed material on heating can be allowed to escape freely. The removal of this air insures the thorough and uniform penetration of the liquor and thus assists in securing regular cooking. After the air has been removed, the digester can be sealed, but it is better to allow a small escape of steam from the top, as this throughout the process of cooking assists in maintaining the proper circulation of the liquor. The full pressure of 85 to 90 lbs. per square inch above atmosphere is reached in two or three hours, and the cooking is thereafter generally completed in eight to nine hours, the stages of resolution and terminal point being determined by analysis of the liquor as described in Patent No. 1,143,401 of 1915. It is to be noted that when using this process there is in the first stages of the cook an insufficiency of free or available $SO_2$ to sulfonate the lignin, and although same may be separated from the fiber by the solution of the pectic substances, its ultimate solution depends upon the liberation of the $SO_2$ originally combined as the sulfite, and thus it is at the final stages of the resolution before all the separated ingredients are brought into solution.

When there is a slight shortage of $SO_2$, although the incrusting or intercellular matters may be fairly well separated, they are only soluble at the high temperature prevalent in the digester, and on cooling the spent liquor, instead of being translucent, (as is the case where the proper quantity of $SO_2$ is used) becomes cloudy and throws down a deposit which renders the pulp difficult to wash and bleach.

What I claim is:—

1. A process for the production of an acid magnesium-sulfite solution for the extraction of cellulose from fibrous vegetable materials, which consists in maintaining the liquor at such temperature during the formation of the solution that there is dissolved by the $SO_2$ that desired greater proportion of the base than is dissolved at normal temperature.

2. A process for the production of an acid magnesium-sulfite solution for the extraction of cellulose from fibrous vegetable materials, which consists in dissolving the base in the liquor at a temperature above 70° F. and in the presence of sulfur dioxid.

3. A process for the production of an acid magnesium-sulfite solution for the extraction of cellulose from fibrous vegetable materials, which consists in subjecting a suspension of magnesium oxid to the action of hot sulfur dioxid to raise the temperature of the liquor above 70° F., for the purpose set forth.

In testimony whereof I have signed my name to this specification, in the presence of two subscribing witnesses.

JAMES LOCKHART JARDINE.

Witnesses:
 DAVID FERGUSON,
 JAMES EAGLESOM.